No. 864,001. PATENTED AUG. 20, 1907.
H. L. KARGER.
APPARATUS FOR THE PRODUCTION OF MIXTURES OF GAS AND AIR.
APPLICATION FILED OCT. 1, 1903.
3 SHEETS—SHEET 1.
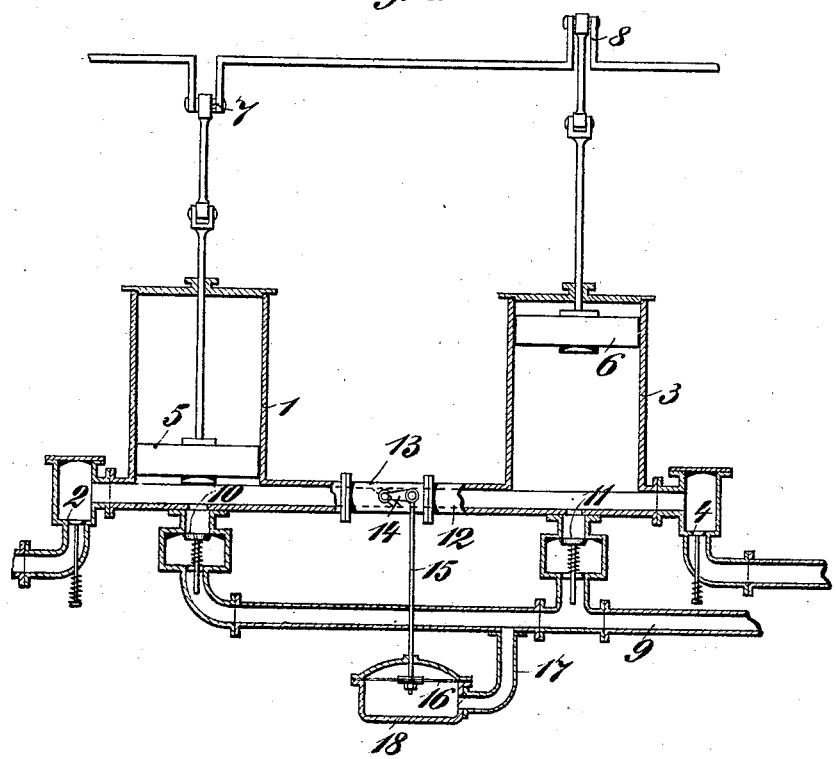
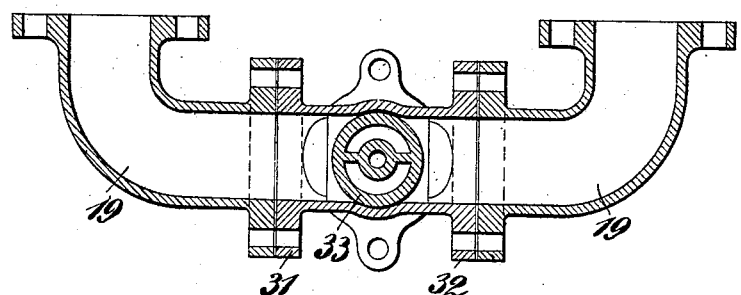
WITNESSES:
W. M. Avery
Walton Harrison
INVENTOR
Heinrich L. Karger
BY
Munn
ATTORNEYS.

No. 864,001. PATENTED AUG. 20, 1907.
H. L. KARGER.
APPARATUS FOR THE PRODUCTION OF MIXTURES OF GAS AND AIR.
APPLICATION FILED OCT. 1, 1903.
3 SHEETS—SHEET 2.
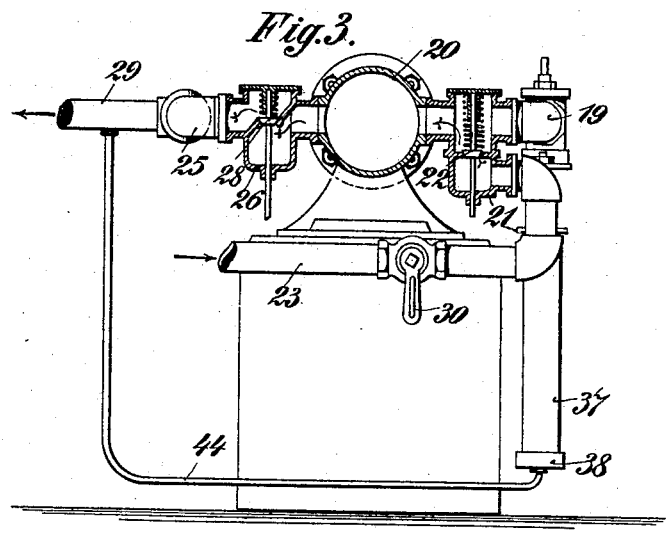
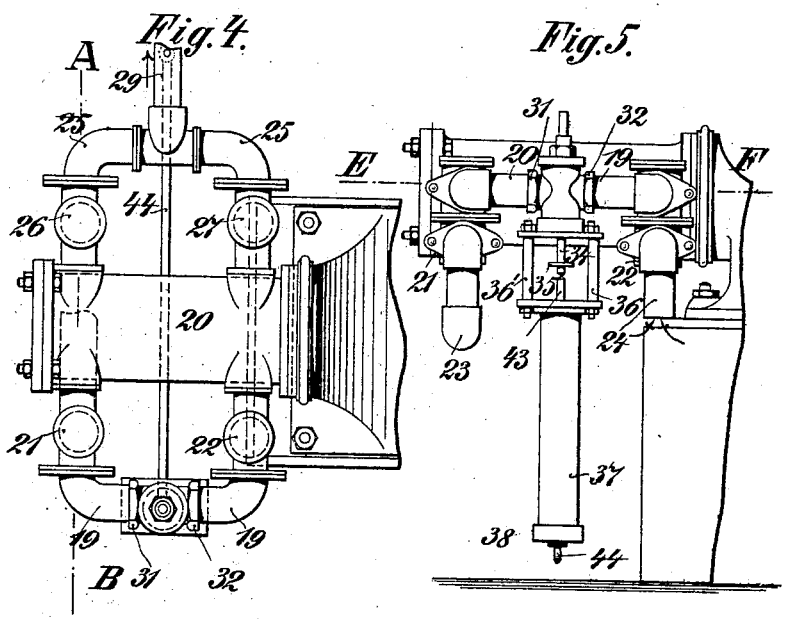
WITNESSES:
W. M. Avery
W. Harrison
INVENTOR
Heinrich Louis Karger
BY
Munn
ATTORNEYS.

No. 864,001.
PATENTED AUG. 20, 1907.
H. L. KARGER.
APPARATUS FOR THE PRODUCTION OF MIXTURES OF GAS AND AIR.
APPLICATION FILED OCT. 1, 1903.
3 SHEETS—SHEET 3.
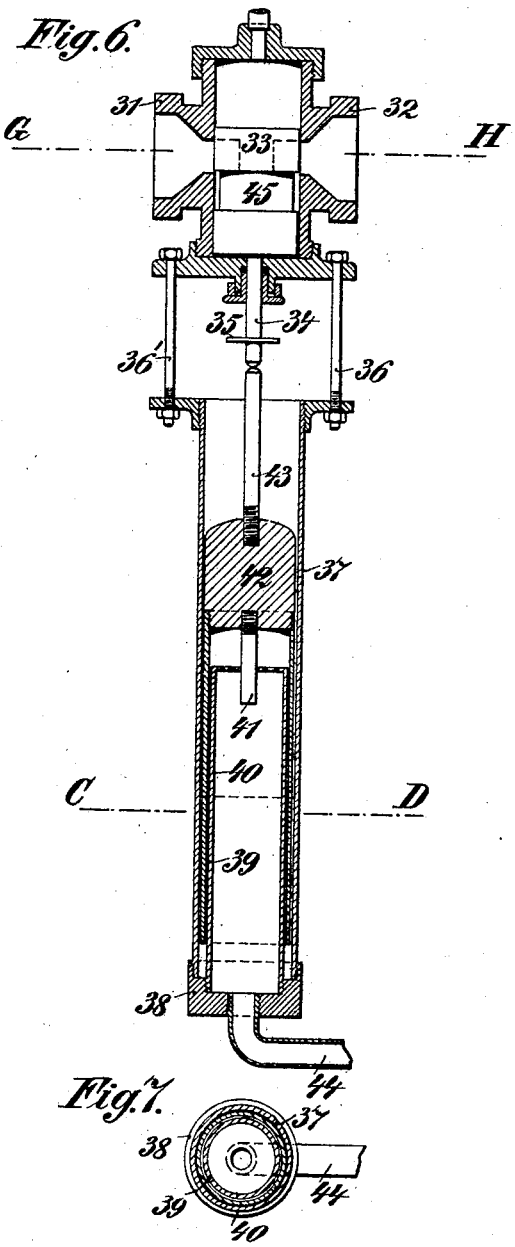
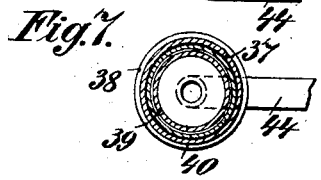
WITNESSES:
W. M. Avery
W. Harrison
INVENTOR
Heinrich Louis Karger
BY
ATTORNEYS.

UNITED STATES PATENT OFFICE.

HEINRICH LOUIS KARGER, OF BERLIN, GERMANY, ASSIGNOR TO THE FIRM OF "SELAS" GESELLSCHAFT M. B. H., OF BERLIN, GERMANY.

APPARATUS FOR THE PRODUCTION OF MIXTURES OF GAS AND AIR.

No. 864,001.            Specification of Letters Patent.            Patented Aug. 20, 1907.

Application filed October 1, 1903. Serial No. 175,328.

*To all whom it may concern:*

Be it known that HEINRICH LOUIS KARGER, a subject of the Emperor of Germany, residing at 26 Frankfurter allee, Berlin, in the Empire of Germany, engineer, has invented certain new and useful Apparatus for the Production of Mixtures of Gas and Air, of which the following is a specification.

My invention relates to apparatus for producing mixtures of gas and air to be used in connection with illuminating burners.

The more particular objects of my invention are to secure uniformity in the admixture as the same is employed under varying degrees of pressure, and also to produce a comparatively simple and efficient form of mixing apparatus for the gas and air.

My invention further relates to certain details of construction for attaining great sensitiveness in the obturating valve, as hereinafter described.

Reference is to be had to the accompanying drawings forming a part of this specification, in which similar characters of reference indicate corresponding parts in all the figures.

Figure 1 is a side diagrammatic section showing the apparatus as employing separate pumps for the gas and air; Fig. 2 is a section upon the line E—F of Fig. 5 and G—H of Fig. 6, showing a revoluble valve 33 for controlling the capacity of the back suction conduit used for relieving excessive pressure in the service mains; Fig. 3 is a section on the line A—B of Fig. 4, showing a form of apparatus in which a common pump is used for both gas and air; Fig. 4 is a plan view of this pump and its accompanying parts; Fig. 5 is a side elevation of the same; Fig. 6 is an enlarged vertical section through the cylinder and float mechanism contained therein for automatically controlling the valve in the back suction conduit; and Fig. 7 is a horizontal section through the same upon the line C—D.

The air suction cylinder 1 of Fig. 1 is in communication with the air admission valve 2, and the gas suction cylinder 3 with the gas admission valve 4 in the known manner. The cranks 7, 8 for the two pistons 5, 6 are arranged at an angle of 180° to each other, so that suction is produced by each alternately. In the pressure conduit 9 common to the two cylinders the two pressure valves 10 and 11 are arranged. The suction chambers of the two cylinders 1 and 3 communicate one with the other by means of the relief pipe 12. In this relief pipe is arranged a throttle or obturating valve 13 or the like, which is connected by means of a lever 14 and rod 15 with a membrane 16 mounted in a special casing 18. The conduit 17 places the lower side of the membrane in communication with the pressure conduit 9.

The operation is as follows: If the pressure in the service conduit 9 increases or diminishes, the actuating device 16 influences the flow regulator 13 in such a manner that the cross-section for the flow is increased or decreased. As a result of an increase of the cross-section of the passage, with the alternate operation of the two suction pistons there will be effected simultaneously with the suction through the opened suction valves, a suction out of the suction and forcing chamber which is for the time being under pressure. The total quantity sucked by each of the two pistons will therefore be constituted: partly by gas and air coming from the suction valves 2 and 4, partly by the supply of gas and air from the suction and forcing chamber which is not effecting suction at the time. If the suction and forcing apparatus is adapted to the maximum requirements, the flow regulator 13 will obturate the cross-section of the passage of the relief pipe 12, as soon as the full supply is required in the service main from the two suction and forcing chambers.

In the constructional form of the apparatus in Figs. 2—5, 19 represents the relief pipe connecting the two ends of the cylinder 20. The extremities of this conduit are fixed to the casings 21 for the gas admission valve and 22 for the air admission valve; 23 and 24 are the gas and air admission pipes respectively. Opposite this conduit are the valve casings 26, 27 for the pressure valves, one of which (the valve 28) is represented in section in Fig. 3. The common pressure conduit 29 is connected with these pressure valve casings by means of bent conduits 25. A cock 30 or the like is provided in the conduit 23 for regulating the supply of gas.

A valve casing is inserted in the circulation conduit 19 by means of flanges 31 32 or by screwing; this casing contains a piston slide 33. The piston rod 34 projects downwards and is provided with a plate 35 for the reception of weights or the like. Upon the lower flange of the valve casing a pipe 37 is attached by screw bolts 36, 36', its lower portion being screwed into an obturating part 38. In this part 38 a second pipe 39 is inserted in such a manner that between the pipe 37 and the pipe 39 an annular space serving for the reception of mercury and of the float 40 is left. The inner pipe 39 is provided above with ribs or the like through the middle point of which the guide rod 41 for the float passes; this rod is screwed into a loading weight 42. Into this weight 42 is also screwed the rod 43 upon which the piston rod 34 of the valve rests by the action of gravity. The interior of the hollow cylinder 39 is connected by the branch pipe 44 with the pressure conduit 29, and this branch pipe is screwed into the obturating part 38.

The operation of this device is as follows: If the pressure in the service main 29 increases or diminishes, the float 40 and with it the piston valve 33 containing the member 45 will rise and fall. By this means the cross-section of the passage of the circulation conduit is increased or diminished. Otherwise the operation is exactly the same as that described with reference to Fig. 1, as in both cases the pressure in the service main controls a valve for governing the flow of the admixture of gas and air through the circulation conduit.

The constructional forms above described and shown in the accompanying drawings may be varied in many respects without departing from the spirit of my invention, the scope of which is governed by the language of the appended claims.

It will be noted that when either form of apparatus is in operation any variation in the back pressure from the service main or its equivalent does not produce a difference in the proportion of gas and air. The result is that no matter what variations may take place in the pressure of the admixture as used, and no matter whether the apparatus may be operated rapidly or slowly, the proportion of the admixture must remain constant. It will also be noted that the form shown in Figs. 2 to 7 inclusive is exceedingly sensitive, because of the sensitiveness of the float.

What I claim and desire to secure by Letters Patent of the United States is:—

The combination of a pressure conduit, pumping mechanism provided with means for receiving separate charges of gas and air and for forcing said charges into said pressure conduit, a pipe connecting different portions of said pumping mechanism together so as to equalize partially between said charges of gas and air, and also to mix said charges together, a valve connected with said pipe for the purpose of varying the effective cross section thereof, and a member connected with said valve for actuating the latter, said member being connected with said pressure conduit and controllable by back pressure therefrom exceeding a predetermined limit.

In testimony whereof I have hereunto set my hand in presence of two subscribing witnesses this 9th day of Septbr 1903.

HEINRICH LOUIS KARGER.

Witnesses:
  WOLDEMAR HAUPT,
  HENRY HASPER.